United States Patent
Fujita et al.

(10) Patent No.: US 7,666,311 B2
(45) Date of Patent: Feb. 23, 2010

(54) FLOCCULATING AGENT

(75) Inventors: Sanai Fujita, Saitama (JP); Kazuhiro Fujita, Tokyo (JP)

(73) Assignees: Eccera Co., Ltd., Tokyo (JP); Hiroyuki Sasaki, Tokyo (JP)

( * ) Notice: Subject to any disclaimer, the term of this patent is extended or adjusted under 35 U.S.C. 154(b) by 56 days.

(21) Appl. No.: 12/097,636

(22) PCT Filed: Dec. 25, 2006

(86) PCT No.: PCT/JP2006/325741

§ 371 (c)(1),
(2), (4) Date: Jun. 16, 2008

(87) PCT Pub. No.: WO2007/074758

PCT Pub. Date: Jul. 5, 2007

(65) Prior Publication Data
US 2009/0159832 A1 Jun. 25, 2009

(30) Foreign Application Priority Data
Dec. 26, 2005 (JP) ............................. 2005-371373

(51) Int. Cl.
*B01D 21/01* (2006.01)
*B03D 3/00* (2006.01)

(52) U.S. Cl. ..................... 210/723; 210/263; 210/506; 210/702; 210/724

(58) Field of Classification Search ................. 252/60, 252/175; 423/608, 610, 308; 502/400, 407; 210/723, 263, 502.1, 506, 510.1, 702, 724, 210/679
See application file for complete search history.

(56) References Cited

U.S. PATENT DOCUMENTS 5,047,255 A 9/1991 Fujita

FOREIGN PATENT DOCUMENTS

| JP | 1-274807 | 11/1989 |
|---|---|---|
| JP | 4-007004 | 1/1992 |
| JP | 9-010508 | 1/1997 |
| JP | 10-165825 | 6/1998 |
| JP | 10-277307 | 10/1998 |
| JP | 11-188204 | 7/1999 |
| JP | 2001-104711 | 4/2001 |
| JP | 2001-129309 | 5/2001 |

OTHER PUBLICATIONS

English Language Abstract of JP 1-274807.
English Language Abstract of JP 10-16582.
English Language Abstract of JP 9-010508.
English Language Abstract of JP10-277307.
English Language Abstract of JP 11-188204.
English Language Abstract of JP 4-007004.
English Language Abstract of JP 2001-104711.
English Language Abstract of JP 2001-129309.

*Primary Examiner*—Jerry Lorengo
*Assistant Examiner*—Heng M Chan
(74) *Attorney, Agent, or Firm*—Greenblum & Bernstein, P.L.C.

(57) ABSTRACT

Among flocculating agents reacting in a neutral region and also leaving treated water also in neutral region, a flocculating agent is proposed, which can be used simply and may carry out effective cleaning of mud water in particular.

A flocculating agent is proposed, which is a flocculating agent in powder form and exhibiting a pH of 5 to 9 when added to pure water, containing in a mixed state an acidic powder comprising porous particles obtained by adsorbing a metal constituent and an alkaline powder comprising porous particles obtained by adsorbing calcium phosphate.

15 Claims, No Drawings

FLOCCULATING AGENT

TECHNICAL FIELD

The present invention relates to a flocculating agent allowing water to be cleaned by addition to various suspension waters, such as, mud water, suspension water containing organic compounds such as from livestock industry system process water and fishery system process water, domestic wastewater generated from households and industrial wastewater generated from plants, to aggregate the suspended solids.

BACKGROUND OF THE INVENTION

In prior art, manure water containing animal manure, and livestock industry system process water containing blood from animal and fish generated in meat plants, fishery plants and the like, were often subjected to cleaning treatment by using the activated sludge method or the like; however, if cleaning with a flocculating agent were possible, this would be simple and very useful.

In addition, during disasters such as storms and earthquakes, if murky mud water or the like could be cleaned simply with a flocculating agent and used as water for daily use, this would also be very useful during disasters. Thus, the cleaning treatment of suspension water by a flocculating agent is characterized by the possibility of being carried out simply even without a special installation.

In prior art, as this type of flocculating agent, known were those having as a main component, for instance, aluminum sulfate, aluminum chloride, ferric chloride and the like. However, as the treated water becomes acidic with a number of flocculating agents used in prior art, treated water cannot be released directly due to issues of contamination of the environment, or the like, requiring separately a treatment for returning to a neutral pH region.

Thus, as flocculating agents reacting at neutral to alkaline with which treated water becomes also neutral, proposed are such flocculating agents in the following:

For instance, disclosed in Patent Reference 1 is a flocculating agent containing animal bone, comprising a dissolved bone solution obtained by dissolving fired pulverized animal bone powder in sulfuric acid or hydrochloric acid.

Disclosed in Patent Reference 2 is a flocculating agent comprising burnt food scrap ashes, animal bone powder and zinc dissolved by mixing with sulfuric acid or hydrochloric acid, and water.

Furthermore, recently, high molecular weight flocculating agents such as polyacrylamide or copolymers thereof have become commercialized and are used commonly. However, when using this high molecular weight flocculating agent, there is the inconvenience that the pH has to be adjusted beforehand. Therefore, for instance, flocculating agents comprising a silicon solution in which silicon dioxide has been dissolved, flocculating agents with silicon dioxide and calcium hydroxide as main components, and the like, have also been proposed (refer for instance to Patent Reference 3).

[Patent Reference 1] Japanese Patent Application Laid-open No. H1-274807

[Patent Reference 2] Japanese Patent Application Laid-open No. H4-7004

[Patent Reference 3] Japanese Patent Application Laid-open No. 2001-104711

DISCLOSURE OF THE INVENTION

Issues to be Addressed by the Invention

The present invention provides a flocculating agent, which is a flocculating agent reacting in a neutral region and leaving treated water also in a neutral region, can be handled simply and allowing mud water, in particular among various suspensions, to be cleaned effectively.

Means to Address the Issues

To solve the issues, the present invention proposes a flocculating agent, which is a flocculating agent in powder form and exhibiting a pH of 5 to 9 when added to pure water and dissolved, containing in a mixed state an acidic powder comprising porous particles obtained by adsorbing a metal constituent and an alkaline powder comprising porous particles obtained by adsorbing calcium phosphate.

The above alkaline powder may contain another constituent as long as it contains 80 percent in weight or greater of calcium phosphate, and preferably 90 percent in weight or greater.

Moreover, it is all the more desirable that, in addition to the above acidic powder and alkaline powder, a neutral powder comprising porous particles obtained by adsorbing a surfactant, or a neutral powder comprising porous particles obtained by adsorbing a proteinase, is contained in a mixed state.

As the flocculating agent proposed by the present invention exhibits a neutral region of pH 5 to 9 in the state added to pure water, reacts in the neutral region and the treated water is also in the neutral region (pH 5 to 9), adjustment of the pH of the flocculating agent beforehand is unnecessary; furthermore, after treatment, pH adjustment of the treated liquid is also unnecessary, such that it can be used extremely simply.

In addition, as it is in powder form, compared to a flocculating agent in fluid, solution form or gel form, not only handling during transportation and storage is convenient, but the activity can be maintained as-is, as long as it is not added to water.

Furthermore, it allows water to be cleaned by addition to various suspension waters, such as, mud water, suspension water containing organic compounds such as from livestock industry system process water and fishery system process water, domestic wastewater generated from households and industrial wastewater generated from plants, to aggregate the suspended solids. Among these, with respect to mud water, cleaning is possible by aggregating suspended solids instantaneously, such that, for instance, during disasters such as storms and earthquakes, water for daily use can be prepared in a short time by addition to murky mud water or the like for cleaning.

BEST MODE FOR CARRYING OUT THE INVENTION

Hereinafter, embodiments of the present invention will be described in detail; however, the scope of the present invention is not limited to the embodiments described hereinafter.

Note that when "X to Y" (X and Y are any numbers) is stated in the present specification, unless otherwise specified, "X or greater and Y or less" is intended, while at the same time, the intent "preferably greater than X and smaller than Y" is also included.

The flocculating agent of the present embodiment (hereinafter referred to as "present flocculating agent") is a flocculating agent containing in a mixed state an acidic powder A (hereinafter referred to as "Acidic Powder A") comprising porous particles containing a metal constituent and an alkaline powder B (hereinafter referred to as "Alkaline Powder B") comprising porous particles containing calcium phosphate, and exhibiting a neutral region of pH 5 to 9 when added to pure water and dissolved.

<Acidic Powder A>

Acidic Powder A is a powder comprising porous particles containing a metal constituent, and is an acidic powder exhibiting a pH in the acidic region when added to pure water and dissolved. In so doing, pH in the acidic region is, for instance pH 0 to 6, within which pH 0 to 3 and among which pH 0 to 2 are particularly desirable.

(Metal)

As metal constituents, those comprising one species or a combination of two or more species among titanium, aluminum, copper, zinc and oxides thereof can be cited. Among these, inclusion of titanium or an oxide thereof as an essential constituent and an additional inclusion of zinc or an oxide thereof is desirable, among which in addition to titanium or an oxide thereof, inclusion of at least one species from aluminum, copper and oxides thereof is all the more desirable.

A content of 20 percent in mass or greater is desirable for titanium, and contents of 10 percent in mass or greater for zinc, 10 percent in mass for aluminum, and 1 percent in mass or greater for copper, are desirable.

In addition, when mixing the four species of titanium, zinc, aluminum and copper, preparation so as to include 20 to 60 percent in mass of titanium, 10 to 30 percent in mass of zinc, 10 to 20 percent in mass of aluminum and 1 to 5 percent in mass of copper is desirable.

(Porous Particle)

It is desirable to use a silicon dioxide particle powder, or a mixed powder of silicon dioxide particles and zeolite particles as porous particles. In so doing, the mixing ratio of silicon dioxide particles and zeolite particles is desirably 60:40 to 90:10 in mass ratio, within which 70:30 to 90:10 is particularly desirable.

Since the finer the particle size of the porous particle, the larger the reaction area and the higher the flocculating power, a median particle diameter (D50) of 200 μm or less, within which 100 μm or less, is desirable.

(Preparation of Acidic Powder A)

Regarding preparation of Acidic Powder A, a metal (including mixed metal powder comprising mixing at least two species or more of titanium dioxide, zinc, aluminum, copper and oxides thereof) is added to an acid, then, as necessary, heated to dissolve the metal in the acid to obtain a solution of metal dissolved in acid. Next, as necessary after diluting by adding hot water, it suffices to let porous particles absorb this solution of metal dissolved in acid and dry.

However, the preparation of Acidic Powder A is not limited to such a preparation method.

As the above acid, sulfuric acid, nitric acid, hydrochloric acid or the like can be cited, among which sulfuric acid is desirable. For instance, when using sulfuric acid to dissolve metal, although dependent on the concentration of sulfuric acid, diluting two to three fold by adding hot water to obtain a solution of metal dissolved in sulfuric acid and letting this solution of metal dissolved in sulfuric acid absorb or attach to porous particles is desirable.

<Alkaline Powder B>

Alkaline Powder B is a powder comprising a porous particle containing calcium phosphate, and is an alkaline powder exhibiting a pH in the alkaline region when added to pure water and dissolved. In so doing, pH in the alkaline region is, for instance, pH 8 to 12, within which pH10 to 12 is particularly desirable.

In so doing, Alkaline Powder B may contain another constituent as long as it contains 80 percent in weight or greater, and preferably 90 percent in weight or greater, of calcium phosphate.

Although calcium phosphate may be chemically synthesized, bone from animal, bone from fish, or fish scales and the like, may be used as raw materials. With the proviso that bone from animal, bone from fish or fish scales must be mineralized by firing, as organic compounds must be eliminated for use in the present flocculating agent. As a result of various tests, it was found that porous particles that adsorbed fired animal bone constituent obtained by firing animal bone, in particular fired cow bone constituent obtained by firing cow bone, rather than chemically synthesized calcium phosphate, was more desirable on the point of the effects.

Thus, fired animal bone constituent will be described hereinafter.

(Fired Animal Bone Constituent)

Fired animal bone constituent can be obtained by dissolving fired animal bone powder in an alkaline solution.

Fired animal bone powder is a bone powder having as raw materials bone from animal. Since pigs, boars and the like have abundant cartilage, a large fraction melts at the boiling step in the middle of the preparation, such that those powders for which the raw materials are bones from animals having hard bone as the main component, such as cow, horse and sheep, and in particular bones from cow, are desirable.

In addition, for fired animal bone powder, those fired at around 800 to 1800° C., and in particular at around 800 to 1100° C. are desirable. Fired animal bone powder obtained by firing in this way comprises micro-particles provided with a multitude of microscopic pores communicating from the interior to the exterior of the particles, and contains 90 percent in weight or greater of calcium phosphate. As elemental composition, with phosphorus and calcium as the main components, barium, sodium, sulfur, magnesium, potassium, chlorine, amine, iron and the like, are contained, exhibiting alkalinity when ionized.

For the fired animal bone powder used in the present flocculating agent, those that are 20 mesh to 400 mesh, and in particular 200 mesh to 325 mesh are desirable. In terms of particle size distribution, those with a median particle diameter (D50) of 1 μm to 10 μm are desirable, and more desirable, those with a D50 of 1 μm to 5 μm.

Hereinafter, one example of preparation method for the above-mentioned fired animal bone powder will be described; however, the preparation method for the fired animal bone powder used in the present flocculating agent is not limited to the following method.

While being chopped to appropriate sizes, the above crude animal bones are cut to sizes that are convenient for boiling; then, the crude bones are introduced into a pressure vessel (compression vessel) and boiled at approximately 200 to 400° C. for on the order of 60 minutes while a pressure of around 5 atmospheres is applied. This boiling step is a step for separating and removing organic compounds such as glue, fat and bone marrow from bone. Through this boiling step, most organic compounds attached not only on the outside of the bones but also within the pores can be separated and removed from the bones.

In the boiling step, boiling is carried out by applying a pressure of around 5 atmospheres. This allows the action of separating the organic compounds attached to bones to be accelerated. In addition, when boiling, it is desirable to carry out boiling by mixing caustic soda or manufactured bone powder in the pressure vessel. This leads to the organic compounds being saponified by the action of alkali such as caustic soda or potassium hydroxide and becoming readily soluble in water, which allows the action of separation of organic compounds to be accelerated and allows the boiling time to be further shortened. In this case, as the mixing amount of caustic soda or bone powder with respect to 200 kg of crude bone, it is desirable to mix 200 cc to 300 cc of caustic soda or on the order of 500 g to 1 kg of bone powder. Then, it is desirable to pour water or hot water over the post-boiling bones to rid of organic compounds and other contaminants.

Continuing, the post-boiling bones are, as necessary, enclosed in a freezer (deep-freezer) to be frozen. However, freezing may not be necessary.

This freezing step is a step for freezing post-boiling bones directly, focusing on the point that post-freezing bones are extremely brittle and easier to grind. It is desirable that the temperature at freezing time is on the order of minus 100° C. to minus 40° C., and that the freezing time is around 1 hour to 3 hours.

Next, post-boiling bones (when frozen as described above, bones in frozen state) are ground into coarsely-ground state using a hammer, and subjected further to a powder machine to be brought into powder form.

Then, the bone powder that has undergone the above step is fired in a furnace, and ultimately, the particle size range is adjusted through classification or the like.

As for firing conditions, it is desirable to carry out firing at a firing temperature of around 800 to 1800° C., preferably around 800 to 1100° C., for a firing time of around 60 minutes to 180 minutes. In this way, ceramics can be obtained, from which some organic compounds that may remain inside the bone powder have been completely eliminated.

(Porous Particle)

It is desirable to use silicon dioxide particle powder, or a mixed powder of silicon dioxide particles and zeolite particles as porous particle. In so doing, the mixing ratio of silicon dioxide particles and zeolite particles is desirably 60:40 to 90:10 in mass ratio, within which 70:30 to 90:10 is particularly desirable.

Since the finer the particle size of the porous particle, the larger the reaction area and the higher the flocculating power, a median particle diameter (D50) of 200 μm or less, within which 100 μm or less and among which 10 μm or less is desirable.

(Preparation of Alkaline Powder B)

Preparation of Alkaline Powder B, a Fired Animal Bone Powder Having calcium phosphate as a main component is added to an alkaline solution and dissolved while heating as necessary to prepare a solution of bone constituents dissolved in alkali, or, fired animal bone powder and an alkaline constituent are mixed, this mixture is added water and dissolved while heating as necessary to prepare a solution of bone constituents dissolved in alkali, and let porous particles absorb this solution of bone constituents dissolved in alkali and dry.

However, the preparation of Alkaline Powder B is not limited to such a preparation method.

As the above alkali or alkaline solution, for instance, sodium hydroxide, potassium hydroxide, calcium hydroxide, barium hydroxide, aqueous ammonia, copper hydroxide, aluminum hydroxide, iron hydroxide, ammonium hydroxide, sodium bicarbonate, or aqueous solutions thereof, and the like, can be cited, sodium hydroxide (caustic soda) or aqueous solution thereof is the most desirable.

For instance, it is desirable that fired animal bone powder and caustic soda are mixed, this mixture is added to water and dissolved while being boiled to 100° C. to prepare a solution of bone constituents dissolved in alkali, and let porous particles absorb this solution of bone constituents dissolved in alkali and dry.

<Mixing Ratio>

It suffices to adjust the mixing ratio of Acidic Powder A and Alkaline Powder B to a ratio which the obtained mixed powder exhibits a neutral region (pH 5 to 9). Within it, adjustment to be a ratio in a region where the obtained mixed powder exhibits pH 5.5 to 8.5 and in particular pH 6.0 to 8.0 is desirable.

<Other Constituents>

Other constituents may be added in addition to Acidic Powder A and Alkaline Powder B, as long as the effects thereof are not impeded; however it is important that the other constituents should be prepared in a region exhibiting neutrality (pH 5 to 9, and preferably pH 6 to 8). Among them, addition of neutral powder comprising porous particles containing a surfactant or neutral powder comprising porous particle containing a proteinase allows the flocculating power of the present flocculating agent to be increased further. In so doing, it is desirable that the quantity added is 3 to 10 parts in mass, and in particular 3 to 8 parts in mass, with respect to roughly 100 parts in mass of mixing amount of Acidic Powder A and Alkaline Powder B.

By adding porous particles containing a surfactant, the affinity of Acidic Powder A and Alkaline Powder B and processing solution increases further when the present flocculating agent is added to the processing solution, allowing the flocculating power to be increased all the more.

In so doing, it is desirable to use as porous particles those that are identical to the porous particles of Acidic Powder A or Alkaline Powder B.

In addition, surfactants can be generally classified into cationic series, anionic series, amphoteric ion series and non-ionic series, surfactants to be used exhibiting a neutral region (pH 5 to 9, and preferably pH 6 to 8) when added to pure water are desirable.

Meanwhile, since addition of a neutral powder comprising porous particles containing a proteinase allows protein or a macromolecule contained in the processing solution to be decomposed and aggregated easier, it is desirable to add the neutral powder to a flocculating agent used for treating a suspension containing a protein or a macromolecule.

In so doing, it is desirable to use as porous particles those that are identical to the porous particles of Acidic Powder A or Alkaline Powder B.

As for the proteinase, there are no particular limitations and commercialized a proteinase can be used. For instance, product name Kao alkaline protease (KAP) manufactured by Kao Corporation, product names Savinase, Alcalase, Esperase, Everlase, and the like, manufactured by Novonordisk Company, and product names Maxacal, Maxapem, Purafect, Opti-clean, Properase, and the like, manufactured by Genencore International, can be cited.

(Application)

The present flocculating agent allows water to be cleaned by addition to various suspension waters, such as, mud water, suspension water containing organic compounds such as from livestock industry system process water and fishery system process water, domestic wastewater generated from households and industrial wastewater generated from plants, to aggregate the suspended solids. Among these, it allows suspension water containing organic compounds such as from livestock industry system process water and fishery system process water to be cleaned effectively. In addition, with respect to mud water, cleaning is possible by aggregating suspended solids instantaneously, such that, for instance, during disasters such as storms and earthquakes, water for daily use can be prepared in a short time by addition to murky mud water or the like for cleaning.

With the proviso that, when the water to be treated is alkaline or acidic, it is necessary to adjust to a neutral region, and then add the present flocculating agent.

EXAMPLES

Example 1

A mixed metal powder was obtained by mixing 60 parts in mass of titanium oxide, 15 parts in mass of aluminum, 5 parts in mass of copper and 20 parts in mass of zinc, 80 g of this mixed metal powder was added to 1 L of sulfuric acid at pH 1 and heated for one hour to melt the metals in the acid to obtain a solution of metals dissolved in sulfuric acid; this solution of metals dissolved in sulfuric acid was diluted two-fold by adding hot water, then, dissolution residues were filtered, porous particles (a mix of 20 percent in mass of zeolite and 80 percent in mass of silica ($SiO_2$)) were introduced therein, stirred, and let the porous particles absorbed the solution of metals dissolved in sulfuric acid, and dried to obtain Acidic Powder A-1.

Meanwhile, 30 parts in mass of fired animal bone powder with a particle size (D50) of 1 μm and 20 parts in mass of caustic soda were mixed, this mixed powder was added to water, stirred while boiling to 100° C. to dissolve fired animal bone powder and caustic soda to obtain a solution of bone constituents dissolved in alkali (pH 12). After the dissolution residues of this solution of bone constituents dissolved in alkali were filtered, porous particle (a mix of 20 percent in mass of zeolite and 80 percent in mass of silica ($SiO_2$)) were introduced in the solution, stirred to be adsorbed, and dried to obtain Alkaline Powder B-1.

The above Acidic Powder A-1 and Alkaline Powder B-1 were mixed in a proportion of 1:1 in mass ratio to obtain flocculating agent G-1 (pH 7).

Note that, crude bones from cow were chopped and cut, then introduced together with sodium hydroxide into a pressure vessel (compression vessel) and boiled at 300° C. for on the order of 60 minutes while applying a pressure of 5 atmospheres, and after drying, were ground into a coarsely-ground state using a hammer, subjected further to a powder machine to be into a powder form to obtain bone powder, the obtained bone powder was fired at 1000° C., and classified into 325 mesh (particle size distribution D50: 3 μm) to obtain the fired cow bone powder used as the above-mentioned "fired animal bone powder". The constituents (analytical values) of the fired cow bone powder were CaO:54.28 percent in weight, $P_2O_3$:41.29 percent in weight, MgO:0.95 percent in weight, $Na_2O$:0.89 percent in weight, $SiO_2$:0.05 percent in weight, and residual: SrO, $K_2O$, BaO, $Fe_2O_3$, $Al_2O_3$ and the like (Ca/P (molar ratio) 1.66).

Example 2

The mass ratio of the above Acidic Powder A-1 and Alkaline Powder B-1 was adjusted in Example 1 to obtain flocculating agent G-2 of pH 5.5.

Example 3

The mass ratio of the above Acidic Powder A-1 and Alkaline Powder B-1 was adjusted in Example 1 to obtain flocculating agent G-3 of pH 8.5.

Example 4

Flocculating agent G-4 was obtained similarly to Example 1, except that instead of Acidic Powder A-1 in Example 1, the following Acidic Powder A-2 was used.

A mixed metal powder was obtained by mixing 50 parts in mass of titanium oxide, 20 parts in mass of aluminum, 5 parts in mass of copper and 25 parts in mass of zinc, 80 g of this mixed metal powder was added to 1 L of sulfuric acid at pH 1 and heated for one hour to melt the metals in the acid to obtain a solution of metals dissolved in sulfuric acid; this solution of metals dissolved in sulfuric acid was diluted two-fold by adding hot water, then, dissolution residues were filtered, porous particles (a mix of 20 percent in mass of zeolite and 80 percent in mass of silica ($SiO_2$)) were introduced therein, stirred and let the porous particles absorbed the solution of metals dissolved in sulfuric acid, and dried to obtain Acidic Powder A-2.

Example 5

Flocculating agent G-5 was obtained similarly to Example 1, except that instead of Acidic Powder A-1 in Example 1, the following Acidic Powder A-3 was used.

A mixed metal powder was obtained by mixing 60 parts in mass of titanium oxide, 30 parts in mass of aluminum and 10 parts in mass of zinc, 80 g of this mixed metal powder was added to 1 L of sulfuric acid at pH 1 and heated for one hour to melt the metals in the acid to obtain a solution of metals dissolved in sulfuric acid; this solution of metals dissolved in sulfuric acid was diluted two-fold by adding hot water, then, dissolution residues were filtered, porous particles (a mix of 20 percent in mass of zeolite and 80 percent in mass of silica (SiO2)) were introduced therein, stirred and let the porous particles absorbed the solution of metals dissolved in sulfuric acid, and dried to obtain Acidic Powder A-3.

Example 6

Flocculating agent G-6 was obtained similarly to Example 1, except that instead of Acidic Powder A-1 in Example 1, the following Acidic Powder A-4 was used.

A mixed metal powder was obtained by mixing 80 parts in mass of titanium oxide and 20 parts in mass of zinc, 80 g of this mixed metal powder was added to 1 L of sulfuric acid at pH 1 and heated for one hour to melt the metals in the acid to obtain a solution of metals dissolved in sulfuric acid; this solution of metals dissolved in sulfuric acid was diluted two-fold by adding hot water, then, dissolution residues were filtered, porous particles (a mix of 20 percent in mass of zeolite and 80 percent in mass of silica (SiO2)) were introduced therein, stirred and let the porous particles absorbed the solution of metals dissolved in sulfuric acid, and dried to obtain Acidic Powder A-4.

Comparative Example 1

Example of U.S. Pat. No. 1,843,850

With respect to 1 kg of fired animal bone powder, 1 L of sulfuric acid at pH 1 was mixed to dissolve the bone powder, thereafter, this was diluted two-fold by addition of water and filtered to prepare a dissolved bone solution H.

In addition, with respect to 100 g of copper, 1 L of sulfuric acid at pH 1 was mixed to dissolve the copper, thereafter, this was diluted two-fold by addition of water and filtered to prepare a dissolved metal solution 1.

Comparative Example 2

The mass ratio of the above Acidic Powder A-1 and Alkaline Powder B-1 was adjusted in Example 1 to obtain flocculating agent G-7 of pH 4

Comparative Example 3

The mass ratio of the above Acidic Powder A-1 and Alkaline Powder B-1 was adjusted in Example 1 to obtain flocculating agent G-8 of pH 10.

[Flocculation Tests]

(Test 1)

Suspension water (pH 6.5) was prepared by introducing into a PET bottle that can contain 100 mL or more, 100 mL of tap water and earth collected in a field, placing the lid (cap) and shaking vigorously.

After preparing suspension water as described above, the lid was opened immediately and three drops of dissolved metal solution I prepared in Comparative Example 1 were added, then, the lid (cap) was placed, the bottle was shaken vigorously, then, similarly, three drops of dissolved bone solution H prepared in Comparative Example 1 were added, the lid (cap) was placed, the bottle was shaken vigorously, and the situation was observed.

As a result, it took 90 seconds from starting to shake vigorously until suspended solids aggregated and precipitated and the water became clean.

(Test 2)

Suspension water (pH 6.5) was prepared by introducing into a PET bottle that can contain 100 mL or more, 100 mL of tap water and earth collected in a field, placing the lid (cap) and shaking vigorously.

After preparing suspension water as described above, the lid was opened immediately and three drops of flocculating agents G-1 to G-8 prepared in Examples 1-6 and Comparative Examples 2-3 were added, then, the lid (cap) was placed, the bottle was shaken vigorously, and the situation was observed.

As a result, for all of G-1 to G-4, the suspended solids aggregated and precipitated and the water became completely clean within 15 seconds from starting to shake vigorously.

In addition, the suspended solids aggregated and precipitated and the water became completely clean after 15 seconds and within 30 seconds from starting to shake vigorously regarding G-5, and after 30 seconds and within 60 seconds from starting to shake vigorously regarding G-6.

Meanwhile, for G-7 and G-8, even after 90 seconds elapsed from starting to shake vigorously, suspended solids did not aggregate and the water could not be cleaned.

(Discussion)

The cleaned waters obtained in Test 1 and Test 2 were both colorless and transparent; however, the flocculating agents G-1 to G-4 all aggregated and precipitated instantaneously when vigorously shaken after adding in Test 2, in contrast, aggregation and precipitation took time in Test 1. Although flocculating agents G-5 and G-6 took some time for aggregation and precipitation compared to flocculating agents G-1 to G-4, they aggregated and precipitated within a shorter time than Test 1.

In addition, the fact of the matter was, trials and errors were necessary until determining the proportion of dissolved metal solution I and dissolved bone solution H to 3 drops each in Test 1, and adjusting the mixing ratio was cumbersome.

The invention claimed is:

1. A flocculating agent, which is a flocculating agent in powder form and exhibiting a pH of 5 to 9 when added to pure water and dissolved, containing in a mixed state an acidic powder comprising porous particles obtained by adsorbing a metal constituent and an alkaline powder comprising porous particles obtained by adsorbing calcium phosphate.

2. The flocculating agent as recited in claim 1, wherein said alkaline powder is a porous particle obtained by adsorbing fired animal bone constituent obtained by firing bone from animal.

3. The flocculating agent as recited in claim 1, containing in the mixed state a neutral powder comprising a porous particle obtained by adsorbing a surfactant, in addition to said acidic powder and alkaline powder.

4. The flocculating agent as recited in claim 1, containing in the mixed state a neutral powder comprising a porous particle obtained by adsorbing a proteinase, in addition to said acidic powder and alkaline powder.

5. The flocculating agent as recited in claim 1, wherein said acidic powder contains titanium or an oxide thereof as the metal constituent.

6. The flocculating agent as recited in claim 1, wherein said acidic powder contains at least one species from aluminum, copper and oxides thereof, together with titanium or an oxide thereof as the metal constituents.

7. The flocculating agent as recited in claim 1, wherein a base material of the porous particle is silicon dioxide particle, or mixed particles of silicon dioxide particle and zeolite particle.

8. The flocculating agent as recited in claim 2, containing in the mixed state a neutral powder comprising a porous particle obtained by adsorbing a surfactant, in addition to said acidic powder and alkaline powder.

9. The flocculating agent as recited in claim 2, containing in the mixed state a neutral powder comprising a porous particle obtained by adsorbing a proteinase, in addition to said acidic powder and alkaline powder.

10. The flocculating agent as recited in claim 2, wherein said acidic powder contains titanium or an oxide thereof as the metal constituent.

11. The flocculating agent as recited in claim 2, wherein said acidic powder contains at least one species from aluminum, copper and oxides thereof, together with titanium or an oxide thereof as the metal constituents.

12. The flocculating agent as recited in claim 2, wherein a base material of the porous particle is silicon dioxide particle, or mixed particles of silicon dioxide particle and zeolite particle.

13. A flocculating agent, which is the flocculating agent in powder form and exhibiting a pH of 5 to 9 when added to pure water and dissolved, containing in a mixed state an acidic powder comprising porous particles obtained by adsorbing a metal constituent and an alkaline powder comprising porous particles obtained by adsorbing fired animal bone constituent obtained by firing bone from animal, and said acidic powder contains aluminum and copper, together with titanium or an oxide thereof as the metal constituents.

14. The flocculating agent as recited in claim 13, containing in the mixed state a neutral powder comprising a porous particle obtained by adsorbing a surfactant, in addition to said acidic powder and alkaline powder.

15. The flocculating agent as recited in claim 13, containing in the mixed state a neutral powder comprising a porous particle obtained by adsorbing a proteinase, in addition to said acidic powder and alkaline powder.

* * * * *